(12) United States Patent
Heikkila

(10) Patent No.: US 8,667,628 B1
(45) Date of Patent: Mar. 11, 2014

(54) BED FRAME HAVING AN INTEGRATED ROLLER SYSTEM

(71) Applicant: Unto Alarik Heikkila, Garabito Jaco (CR)

(72) Inventor: Unto Alarik Heikkila, Garabito Jaco (CR)

( * ) Notice: Subject to any disclaimer, the term of this patent is extended or adjusted under 35 U.S.C. 154(b) by 0 days.

(21) Appl. No.: 13/689,186

(22) Filed: Nov. 29, 2012

(51) Int. Cl.
*A61G 7/012* (2006.01)
*A61G 7/002* (2006.01)

(52) U.S. Cl.
USPC ........... 5/510; 5/11; 5/509.1; 5/86.1; 5/236.1; 5/611

(58) Field of Classification Search
USPC ................. 5/509.1, 11, 611, 510, 236.1, 86.1
See application file for complete search history.

(56) References Cited

U.S. PATENT DOCUMENTS

| | | | | |
|---|---|---|---|---|
| 721,610 | A * | 2/1903 | Scott | 5/510 |
| 746,636 | A * | 12/1903 | Lawrence | 16/34 |
| 1,082,160 | A * | 12/1913 | Kurowski | 280/43.22 |
| 1,085,444 | A * | 1/1914 | Lawrence | 5/510 |
| 1,999,106 | A * | 4/1935 | Muller | 16/34 |
| 2,599,717 | A * | 6/1952 | Menzies | 5/510 |
| 2,830,304 | A * | 4/1958 | Ericsson | 5/11 |
| 3,676,881 | A * | 7/1972 | Duprey | 5/611 |
| 3,879,796 | A * | 4/1975 | Whyte | 5/510 |
| 4,503,844 | A * | 3/1985 | Siczek | 606/245 |
| 4,565,385 | A * | 1/1986 | Morford | 280/304.1 |
| 5,090,070 | A * | 2/1992 | Heinz | 5/611 |
| 5,095,562 | A * | 3/1992 | Alexander | 5/616 |
| 5,347,682 | A * | 9/1994 | Edgerton, Jr. | 16/34 |
| 5,348,326 | A * | 9/1994 | Fullenkamp et al. | 280/43.17 |
| 5,594,961 | A * | 1/1997 | Yokoi et al. | 5/11 |
| 5,628,522 | A * | 5/1997 | Hall | 280/43.17 |
| 5,903,956 | A * | 5/1999 | Theising | 16/19 |
| 5,940,932 | A * | 8/1999 | LaHay | 16/30 |
| 6,089,593 | A * | 7/2000 | Hanson et al. | 280/650 |
| 6,601,251 | B2 * | 8/2003 | Paul | 5/611 |
| 6,843,625 | B2 * | 1/2005 | Hewitt | 410/66 |
| 6,941,600 | B2 * | 9/2005 | Freeborn et al. | 5/611 |
| 7,014,000 | B2 * | 3/2006 | Kummer et al. | 180/19.3 |
| 7,162,757 | B2 * | 1/2007 | Edgerton | 5/600 |
| 2002/0189015 | A1 * | 12/2002 | Barssessat | 5/620 |
| 2005/0172403 | A1 * | 8/2005 | Darling et al. | 5/509.1 |
| 2005/0283912 | A1 * | 12/2005 | Roussy | 5/611 |

* cited by examiner

*Primary Examiner* — Michael Trettel
*Assistant Examiner* — Ifeolu Adeboyejo
(74) *Attorney, Agent, or Firm* — R. William Graham

(57) ABSTRACT

A bed frame has a bed frame having side frame members and cross supports interconnecting the side frame members for supporting one of a mattress and box springs and an integrated roller system which actuates the bed frame between a first wheels up position rollers connected to said bed frame are operably disposed between said bed frame and a floor to ready mobility of the bed frame via the rollers and a second wheels down position such that the bed frame in is in contact with the floor without the rollers contacting the floor and is generally frictionally disposed to inhibit movement.

19 Claims, 4 Drawing Sheets

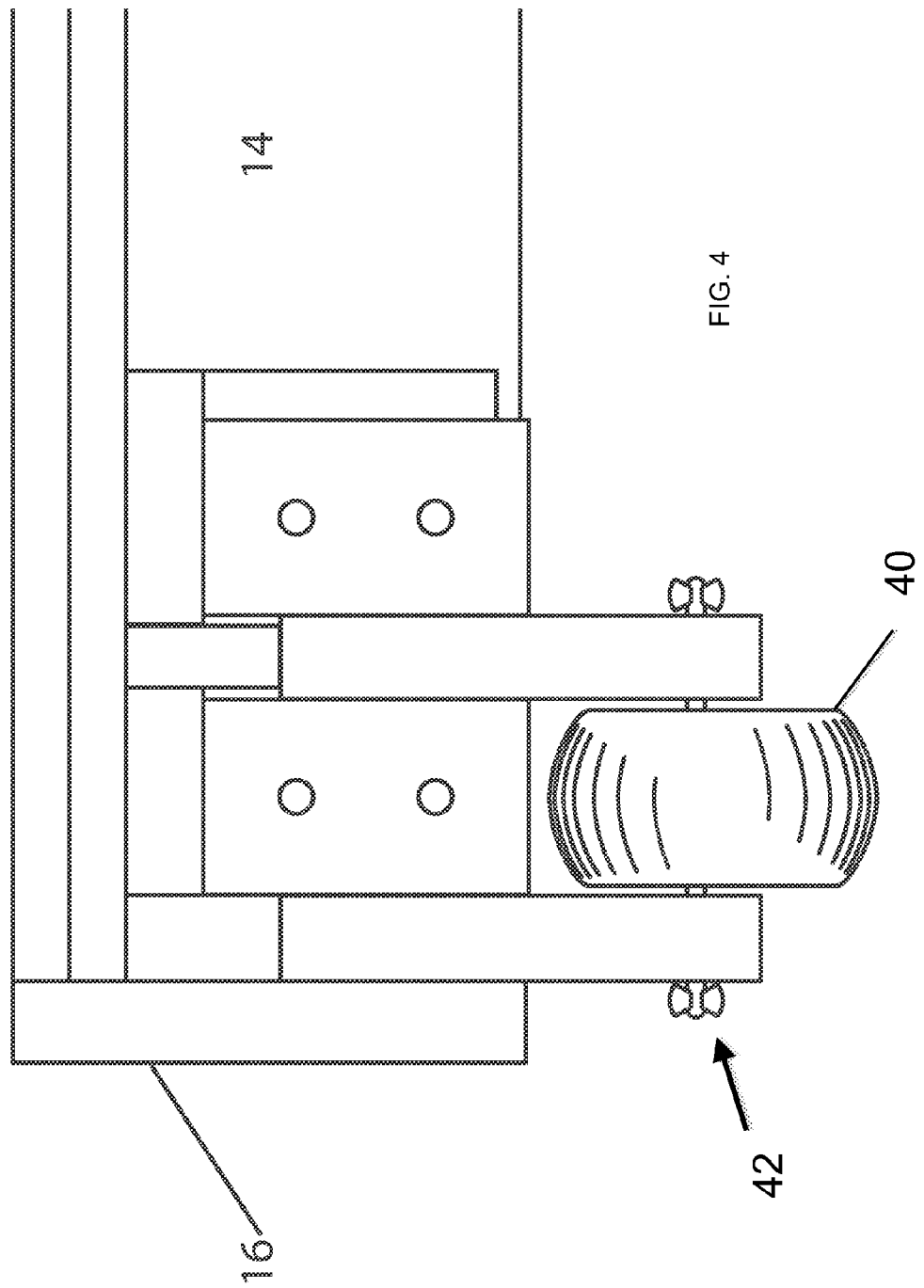

BED FRAME HAVING AN INTEGRATED ROLLER SYSTEM

BACKGROUND OF THE INVENTION

1. Field of Invention

The present invention relates to beds. More particularly, the invention relates to bed frames with integrated rollers.

2. Prior Art

Conventional beds come in a variety of sizes, such as twin, queen and king and frames which accommodate these sizes. The frames are typically made of metal and/or wood construction. Some of the frames come with wheels fixed at the bottom of the frame which makes it easier to move the beds when the mattress is disposed in the bed frame, however, the drawback of such frames is that they also undesirably move at certain times and are not as aesthetically appealing to the eye as bed frames which are fixable disposed on the floor. In the case of such existing roller bed frames, roller cups are placed under the rollers to keep the bed fixed. This creates a nuisance by the user in having to remove the roller cups each time the bed is required to be moved. It remains desirable to have a bed frame which can be easily moved to readily permit cleaning or changing of bed.

Insofar as a manufacturer of beds frames is concerned, it would be highly advantageous to use a roller bed frame which provides for relatively easy moving of a bed while also being aesthetically appealing and also provides a readily fixably position. This invention provides a novel and unobvious roller system for bed frames at a reasonable cost.

BRIEF SUMMARY OF THE INVENTION

It is an object to improve a bed frame.

It is a further object to provide an improved roller bed frame.

It is another object to provide a roller bed frame which provides for relatively easy moving of a bed while also being aesthetically appealing and readily fixably positioned Another object is provide a roller system which is integrated into a bed frame.

Accordingly, one embodiment of the invention is provide a bed frame having side frame members and cross supports interconnecting the side frame members for supporting one of a mattress and box springs and an integrated roller system which actuates the bed frame between one position (e.g., "wheels down") wherein rollers connected to the bed frame are operably disposed between the bed frame and a floor to ready mobility of the bed frame via the rollers and another position ("wheels up") such that the bed frame is in contact with the floor without the rollers contacting the floor and is generally frictionally disposed on the floor to inhibit movement.

In a preferred embodiment, each side frame member can include a front leg and a rearward leg wherein at least the rearward leg is axially spaced from a terminal end of the side frame member. When the bed frame and bed is disposed on the floor, the legs serve to support the bed frame in a relatively fixed position when disposed on the floor.

A rear roller is operably disposed rearward to each rearward leg and is connected to the respective side frame member in a manner such that when the legs are in contact with the floor, the rear rollers are not in contact with floor. By way of example when the legs are in contact with the floor, the rear rollers are spaced above the floor at least about 0.1 cm and preferably about 0.2-0.5 cm.

A forward roller is operably connected to an actuating device which is connected to the bed frame and enables actuating the forward roller to a lower position contacting the floor whereupon so doing the rear rollers are caused to contact the floor and preferably raise the legs out of contact with the floor. In a preferred embodiment, the actuating device includes a pedal which is depressed by one's foot. The actuating device also provides an elevated position for front roller such that the rollers are not contacting the floor leaving legs of the bed frame in contact with the floor and thus generally fixing the position of the bed.

BRIEF DESCRIPTION OF THE DRAWINGS

FIG. 4 depicts a part section view of a rear roller of the instant invention.

Figure 1:
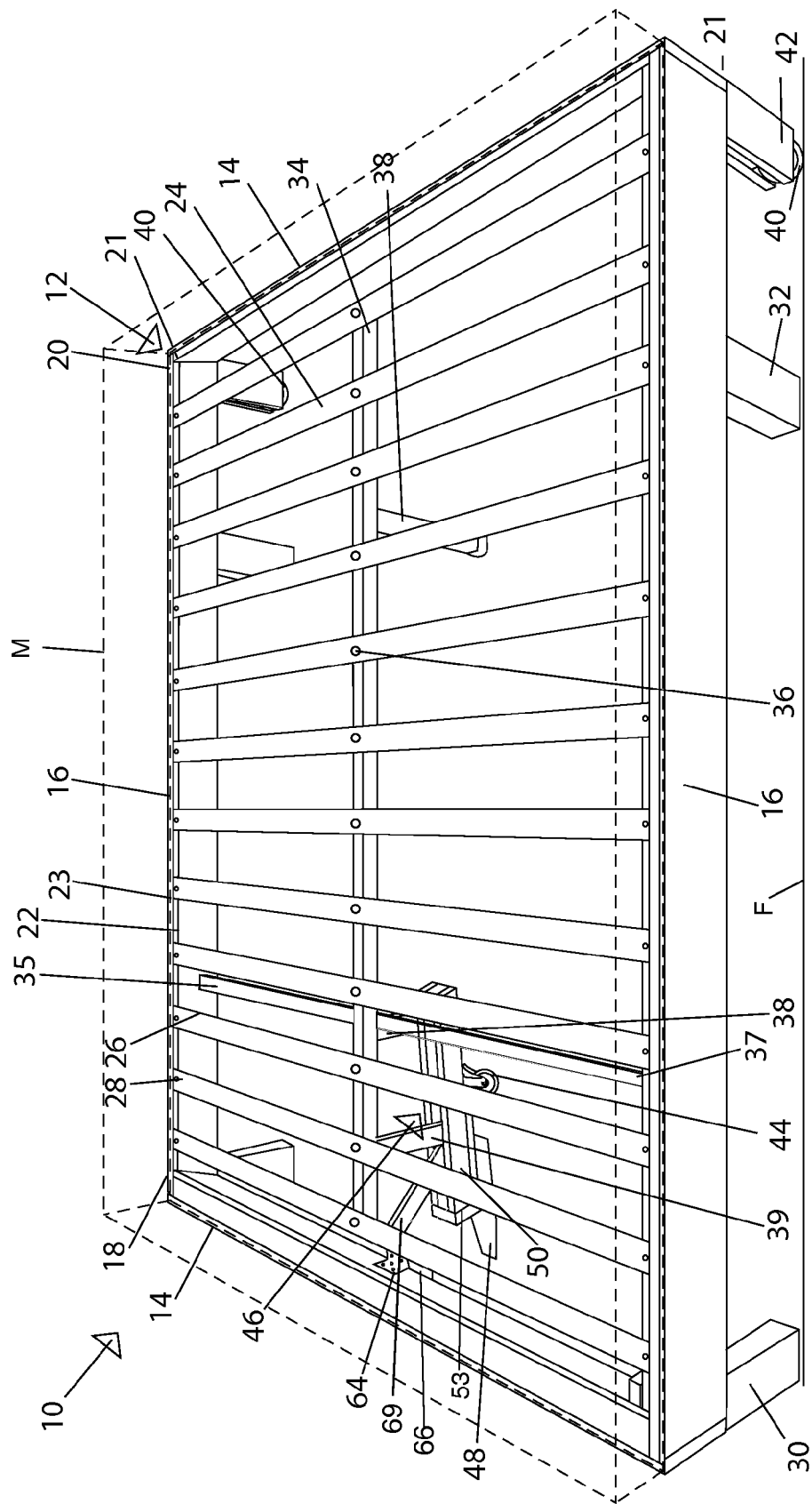
FIG. 1 is a perspective view of a bed frame having an integrated roller system.
Figure 2:
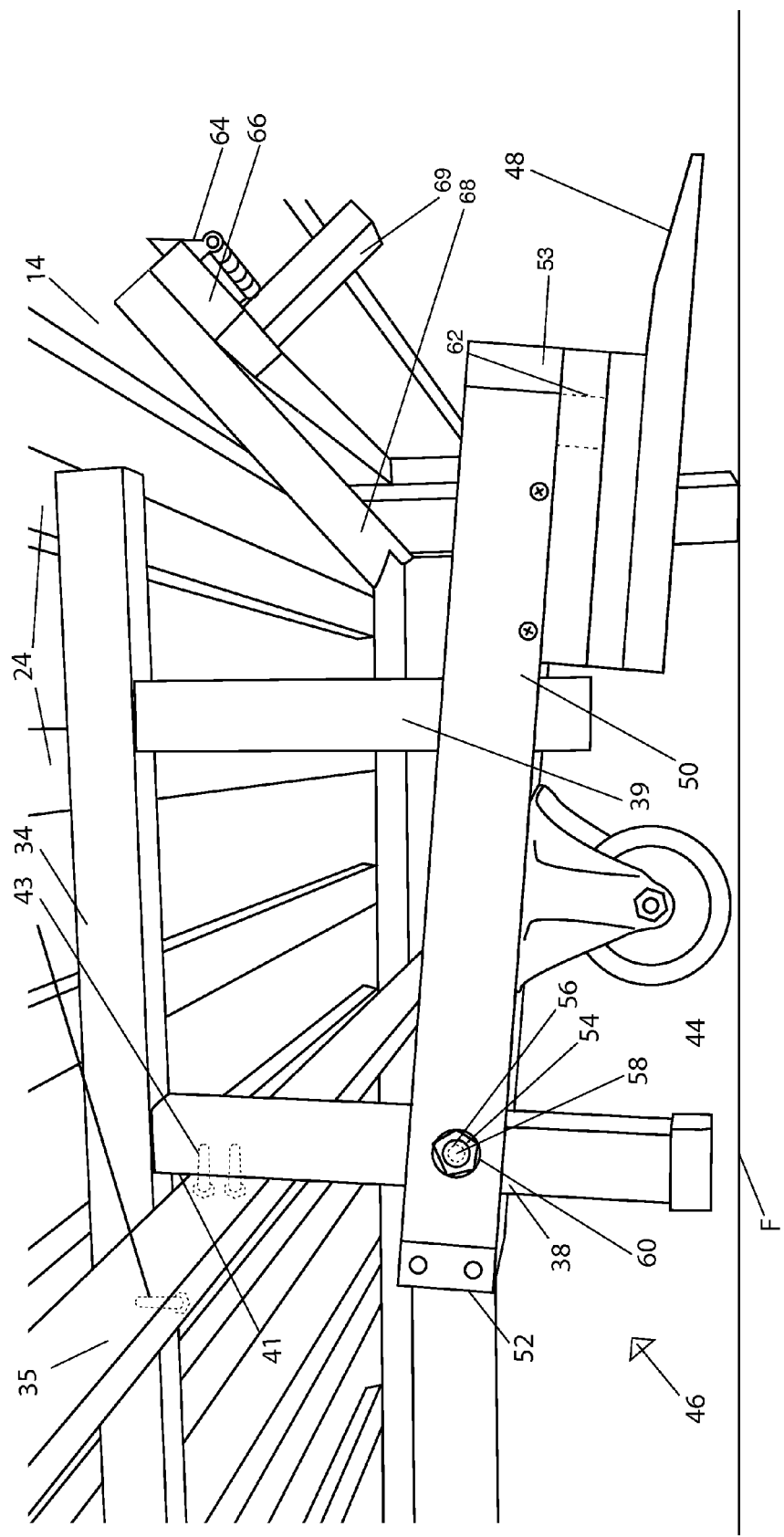
FIG. 2 is a side perspective view a portion of the bed frame having an integrated roller system in a "wheels up" position.
Figure 3:
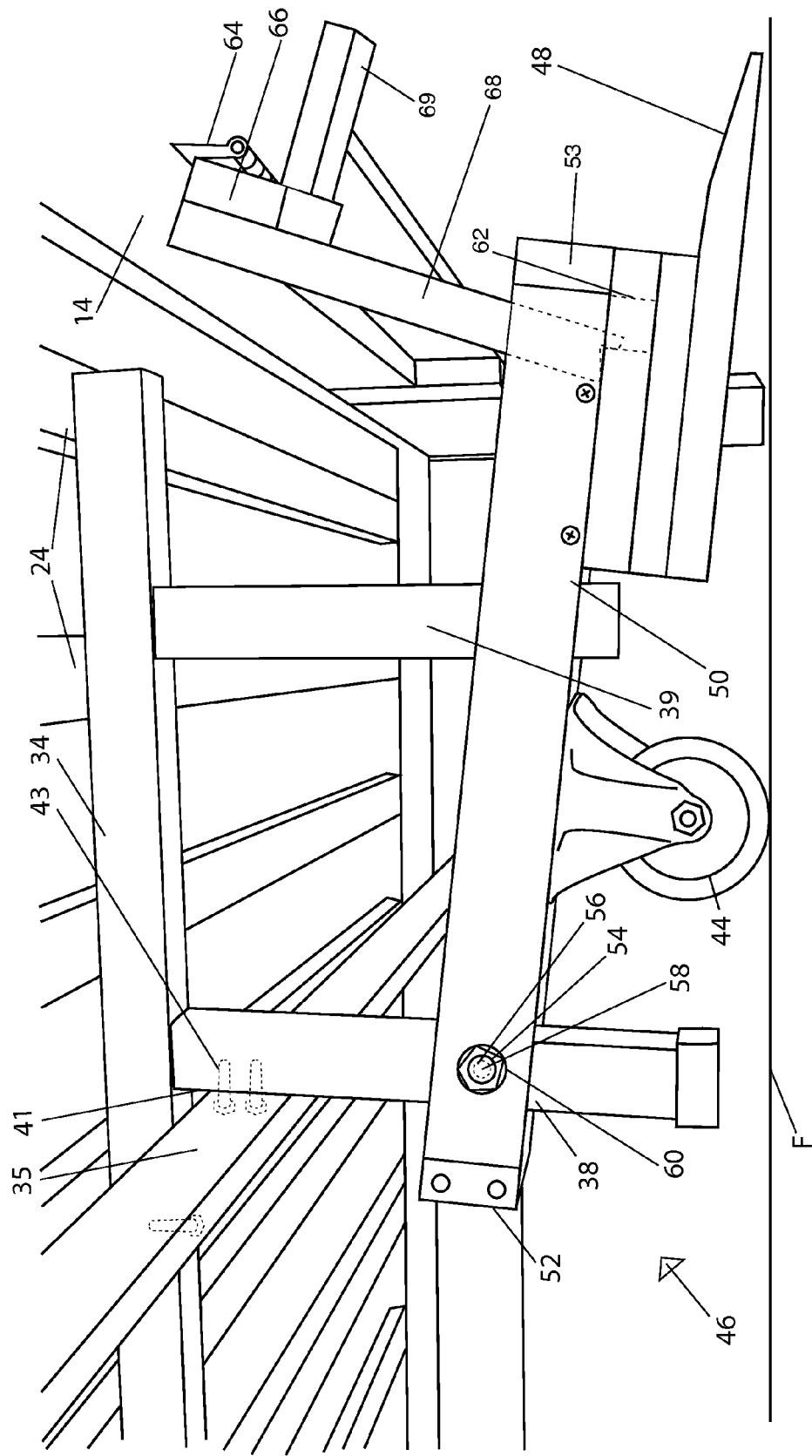
FIG. 3 is a side perspective view a portion of the bed frame having an integrated roller system in a "wheels down" position.

With the above and other objects in view that will hereinafter appear, the nature of the invention will be more clearly understood by reference to the following detailed description, the appended claims and the several views illustrated in the accompanying drawings.

DETAILED DESCRIPTION OF THE PREFERRED EMBODIMENT

Referring to the drawings, a bed frame having an integrated roller system of the instant invention is generally designated by the numeral 10. The bed frame having an integrated roller system 10 includes an adjustable bed frame 12 upon which rests a mattress (or box springs) M of a conventional construction.

One embodiment of the novel bed frame and integrated roller system 10 constructed in accordance with this invention is as follows. The bed frame 12 includes end frame members 14 and side frame members 16 (which opposing members are mirror images of each other). Each side frame member 16 includes a forward end 18 and rearward end 20 and can preferably include a longitudinal ledge 22 formed of a steel strip tube secured to the side frame member 16 by screws for example, which can be connected adjacent upper edge 23 of each side frame member 16. A plurality of cross supports 24 interconnect the side frame members 16 wherein ends 26 of cross supports 24 are retained on the ledge 22 by suitable fasteners, such as screws 28.

In a preferred embodiment, each side frame member 16 can include a front leg 30 and a rearward leg 32. Each rearward leg 32 is axially spaced from a terminal point 21 of rearward end 20. Additionally, there can be a central support member 34 which interconnect one or more of the cross supports 24 by suitable fasteners, such as screws 36. In the case of larger beds, such as king size bed, additional longitudinal support (not shown) can be provided and likewise connected to the cross members 24 and can be similarly formed as central support 34, and in this case two or more supports 34 can be used and connected to cross member 35 as described herein. The central support member 34 does not rigidly connect to end frame members 14 which is important to allow the cross members 24 to flex due to weight.

The central support member 34 can preferably include one or more legs 38 which are of a length such that when the legs 30 and 32 are in contact with the floor F, the rearward legs 38 would normally suspend slightly above the floor F, for example, 0.2 to 0.5 cm above the floor F to accommodate situations where a floor may not be level and assuring the outer most leg 30 touch the floor F before the legs 38. When the bed frame 12 (with sufficient weight from bed mattress and person thereon) is disposed on the floor F, the legs 38 are caused to touch the floor F due to flex of the cross supports 24 (typically wood slats), and the legs 30 with legs 38 serve to support the bed frame 12 in a first fixed position.

Also, a rear roller 40 is operably disposed rearward to each back leg 32 and is connected to the respective side frame member 16 by way of a suitable bracket 42 having an axle bearing thereon which rollably supports the rear roller 40. The rear rollers 40 are slightly suspended above the floor F in a manner such that when at least the legs 30 and 32 are in contact with the floor F, the rear rollers 40 are not in contact with floor. By way of example, when the legs 30 are in contact with the floor F, the rear rollers 40 are spaced above the floor a sufficient amount to readily facilitate the invention, e.g., at least above about 0.1 cm, and preferably about 0.2-0.5 cm to provide ease of movement.

A forward roller 44 can be operably disposed below the bed frame 12 and is operably connected to an actuating device 46 which is connected to the bed frame 12 as will be discussed further herein and enables actuating the forward roller 44 to a lower position contacting floor F wherein the rear rollers 40 are caused to contact the floor F upon such actuation and preferably raise the legs 30 and 32 out of contact with the floor F.

In a preferred embodiment, the actuating device 46 includes a pedal member 48 which is depressed by one's foot and connects to a front support member 53, side support members 50 which are laterally spaced and interconnect a back support member 52 and the front support member 53. A rear portion of each side support member 50 includes a through hole 54 which are axially aligned with a through hole 56 in a forwardly disposed leg 38. When coaxially aligned, a bolt 58 (or other bearing pin) is inserted through holes 54 and 56 and secured using a nut and washer 60. Also, a stabilizing leg 39 is rigidly connected to central support 34 and extends downward though and between a forward end of side support members 50 and serves to keep the side support members 50 pivoting substantially about an axis of bolt 58. To further aid in this regard, there is an additional cross member 35 which rigidly connects to a back side 41 of forward leg 38 and underside of central support 34 by means of threaded members, such as screws 43. Ends 37 of cross member 35 do not connect to side frame member 16 to permit the flex movement of the cross members 24. The stabilizing leg 39 is of sufficiently shorter length than leg 38 to avoid contacting the floor F when the bed frame 12 is in either position wherein the other legs 38 are contacting the floor F, the leg 39 does not interfere with the actuating device 46. The front support member 53 includes a notched receiving surface 62.

To the front end member 14 is connected a hinge 64 which interconnects a stop support brace 66. The stop support brace 66 hingedly swings between an up position and down engaged position. The stop support brace 66 has a leg 68 which is configured with a complementary notched end to be received in the notched surface 62 when in the down position and thus lock the actuating device 46 in a "wheels down" position wherein the rollers 44 and 40 all contact the floor F. There is also provided a kick leg 69 which extends (preferably laterally to the leg 68 at 90 degree, for example) from the support brace 66 to enable easy pivoting of the support brace 66 and insertion/removal of leg 68 into notched surface 62.

The actuating device 46 thus provides an elevated position for front roller 44 at which position the rollers 40 are likewise not contacting the floor F, leaving legs 30,38 of the bed frame 12 in contact with the floor F and thus fixing the position of the bed and inhibiting mobility. When the mattress M is on the bed frame 12, despite that it may weigh a significant amount, one can easily actuate the same between a fixed disposed position ("wheels up") and a mobile position (wheels down) to move the same on a plurality of wheels, as shown in the drawings by depressing with one's foot. The pedal member 48 causes canting of bed frame 10 where support brace leg 68 can move into an engaged position within the notched surface 62. To release, one depresses the foot pedal 48, pushes the engaged leg 68 out of notched surface 62 and while to holding releases the foot pedal 48 to move to the "wheels up" position.

Although a preferred embodiment of the invention has been specifically illustrated and described herein, it is to be understood that minor variations may be made in the apparatus without departing from the spirit and scope of the invention, as defined by the appended claims.

What is claimed is:

1. A bed frame, which includes:
   a bed frame having side frame members and cross supports interconnecting the side frame members for supporting one of a mattress and box springs;
   an integrated roller system which actuates said bed frame between a first wheels down position wherein rollers connected to said bed frame are operably disposed between said bed frame and a floor to ready mobility of said bed frame via said rollers on the floor and a second wheels up position such that said bed frame is in contact with the floor without said rollers contacting the floor and is generally frictionally disposed to inhibit movement;
   a central support member which interconnects one or more of the cross supports by suitable fasteners; wherein said central support member includes at least one or more leg which are of a length such that when said side frame members are in contact with the floor, said one or more leg of said central support member suspends slightly above the floor and wherein each side frame member includes a front leg and a rearward leg, wherein at least the rearward leg is axially spaced from a terminal end of said side frame member and such that when said bed frame is disposed on the floor and a predetermined weight is applied to said cross members to cause flexing thereof and downward movement of said leg of said central support to touch the floor and all said legs serve to support said bed frame in a first fixed position.

2. The bed frame of claim 1, wherein each side frame member includes the front leg and the rearward leg, wherein at least the rearward leg is axially spaced from the terminal end of said side frame member.

3. The bed frame of claim 2, wherein a rear roller is operably disposed rearward to each rearward leg and is connected to the respective side frame member in a manner such that when the legs are in contact with the floor, the rear rollers are not in substantially in contact with floor and is generally frictionally disposed via said legs to preclude movement.

4. The bed frame of claim 3, which is further characterized such that when said legs are in contact with the floor, said rear rollers are spaced above the floor at least above about 0.1 cm.

5. The bed frame of claim 3, which further includes a forward roller is connected to said bed frame and enables actuating said forward roller to a lower position contacting the floor whereupon so doing said rear rollers are caused to contact the floor.

6. The bed frame of claim 5, wherein said actuating device includes a pedal which is depressed by one's foot to cause said actuation.

7. The bed frame of claim 1, which is further characterized to include a plurality of cross supports interconnect said side frame members and wherein ends of said cross supports are retained in a ledge of said side members by fasteners.

8. A bed frame, which includes:
a bed frame having side frame members and cross supports interconnecting the side frame members for supporting one of a mattress and box springs; and
an integrated roller system which actuates said bed frame between a first wheels down position wherein rollers connected to said bed frame are operably disposed between said bed frame and a floor to ready mobility of said bed frame via said rollers on the floor and a second wheels up position such that said bed frame is in contact with the floor without said rollers contacting the floor and is generally frictionally disposed to inhibit movement;
a central support member which interconnects one or more of said cross supports wherein said central support member includes at least one or more leg which are of a length such that when said legs of said side frame members are in contact with the floor, said one or more leg of said central support member suspends slightly above the floor and which is further characterized such that when said bed frame is disposed on the floor and a predetermined weight is applied to said cross members to cause flexing thereof and downward movement of said leg of said central support to touch the floor and all said legs serve to support said bed frame in a first fixed position.

9. The bed frame of claim 3, wherein each said rear roller is operably disposed rearward to each rearward leg and is connected to a respective side frame member by a bracket having an axle bearing thereon which rollably supports said rear roller.

10. The bed frame of claim 1, wherein said actuating device further includes a front side support member, side support members which are laterally spaced and interconnect a back support member and said front side support member which in turn interconnects to pedal member, and a rear portion of each support member includes a through hole which are axially aligned with a through hole a forward one said front leg of said central support and when coaxially aligned receives a bolt inserted through said holes and secured fastener.

11. The bed frame of claim 10, which also includes a stabilizing leg is rigidly connected to central support and extends downward though and between a forward end of support members of said actuating device and serves to keep the support members pivoting substantially about a single axis.

12. The bed frame of claim 11, which includes another cross member which rigidly connects to a back side of said forward leg and ends of cross member rigidly connect to side frame members wherein said stabilizing leg is of shorter length than said other leg of said central support to avoid contacting the floor when said bed frame is in either position.

13. The bed frame of claim 10, wherein said front side support member includes a notched receiving surface.

14. The bed frame of claim 13, wherein said bed frame includes a front end member having a hinge which interconnects a stop support brace for connecting to said front side support such that said stop support brace hingedly swings between an up position and down and engaged position and wherein said stop support brace has a leg which is configured with a complementary notched end to be received in the notched surface of said front side support surface when in the down position and thus lock the actuating device in said first wheels down position wherein the rollers and all contact the floor.

15. The bed frame of claim 8, wherein said actuating device further includes a front side support member, side support members which are laterally spaced and interconnect a back support member and said front side support member which in turn interconnects to pedal member, and a rear portion of each support member includes a through hole which are axially aligned with a through hole a forward one said front leg of said central support and when coaxially aligned receives a bolt inserted through said holes and secured fastener.

16. The bed frame of claim 15, which also includes a stabilizing leg is rigidly connected to central support and extends downward though and between a forward end of support members of said actuating device and serves to keep the support members pivoting substantially about a single axis.

17. The bed frame of claim 16, which includes another cross member which rigidly connects to a back side of said forward leg and ends of cross member rigidly connect to side frame members wherein said stabilizing leg is of shorter length than said other leg of said central support to avoid contacting the floor when said bed frame is in either position.

18. The bed frame of claim 15, wherein said front side support member includes a notched receiving surface.

19. The bed frame of claim 18, wherein said bed frame includes a front end member having a hinge which interconnects a stop support brace for connecting to said front side support such that said stop support brace hingedly swings between an up position and down and engaged position and wherein said stop support brace has a leg which is configured with a complementary notched end to be received in the notched surface of said front side support surface when in the down position and thus lock the actuating device in said first wheels down position wherein the rollers and all contact the floor.

* * * * *